(12) United States Patent
Bell et al.

(10) Patent No.: US 7,904,807 B2
(45) Date of Patent: Mar. 8, 2011

(54) SYSTEM AND METHOD FOR COPYING FORMATTING INFORMATION BETWEEN WEB PAGES

(75) Inventors: David G. Bell, Menlo Park, CA (US); Eric A. Bier, Mountain View, CA (US); Bay-Wei Chang, Foster City, CA (US)

(73) Assignee: Xerox Corporation, Norwalk, CT (US)

( * ) Notice: Subject to any disclaimer, the term of this patent is extended or adjusted under 35 U.S.C. 154(b) by 72 days.

(21) Appl. No.: 10/289,531

(22) Filed: Nov. 5, 2002

(65) Prior Publication Data

US 2004/0088653 A1 May 6, 2004

(51) Int. Cl.
*G06F 17/00* (2006.01)
(52) U.S. Cl. ............................ 715/249; 715/204; 715/205
(58) Field of Classification Search ............... 715/501.1, 715/505, 507, 508, 523, 524, 249, 205, 204
See application file for complete search history.

(56) References Cited

U.S. PATENT DOCUMENTS

| | | | | |
|---|---|---|---|---|
| 6,029,182 | A * | 2/2000 | Nehab et al. | 715/205 |
| 6,055,544 | A * | 4/2000 | DeRose et al. | 707/104.1 |
| 6,173,288 | B1 * | 1/2001 | Diedrich et al. | 707/102 |
| 6,499,041 | B1 * | 12/2002 | Breslau et al. | 715/210 |
| 6,725,265 | B1 * | 4/2004 | Challenger et al. | 709/226 |
| 6,748,425 | B1 * | 6/2004 | Duffy et al. | 709/217 |
| 7,069,501 | B2 * | 6/2006 | Kunitake et al. | 715/513 |
| 2002/0013792 | A1 * | 1/2002 | Imielinski et al. | 707/523 |
| 2002/0073125 | A1 | 6/2002 | Bier | |
| 2002/0143823 | A1 * | 10/2002 | Stevens | 707/523 |

OTHER PUBLICATIONS

Dreamweaver TechNote "Understanding paths in Dreamweaver templates" updated May 3, 1999, p. 1-5.*
Dreamweaver TechNote "Using Dreamweaver 4 templates in Dreamweaver MX" updated Jun. 10, 2002, pp. 1-2.*
XML.com, "Combining Stylesheets with Include and Import" by Bob DuCharme, published Nov. 2000, p. 1-5.*
Zenographics, "PostScript Interpreter" 2001 [Retrieved from the Internet at www.zeno.com/Technology/Windows_Host_Raster_Printing/PostScript.asp on Oct. 31, 2002].
Chang, B., "In-Place Editing of Web Pages: Sparrow Community-Shared Documents," Xerox Palo Alto Research Center, 3333 Coyote Hill Road, Palo Alto, C.A. 94304, U.S.A., (1998) [Retrieved from the Internet at http://www2.parc.com/istl/projects/sparrow/doc/www7 on Oct. 29, 2002].
Bier, E. et al., "Sparrow Web: Group-Writable Web Pages and Their Applications," For Presentation at the Stanford Seminar on People, Computers, and Design on Mar. 15, 2002, PARC (2002).

* cited by examiner

*Primary Examiner* — Amelia Rutledge

(57) ABSTRACT

A system and method for copying formatting information between group editable Web pages is provided. The system includes a web server and devices, such as computers, which can communicate via a network. Users at the computers can access one or more of the Web pages and request that the accessed page's formatting information be copied over to one or more specified target Web pages. The Web server is configured to extract a first set of formatting information, such as HTML formatting templates, from a source web page displayed on one or more computers in the network. Further, the Web server replaces a corresponding second set of formatting information in the target Web page(s) with the first set of extracted formatting information.

37 Claims, 11 Drawing Sheets

```
<HTML><HEAD>Normal HTML header mark-up<META HTTP-EQUIV="pragma" CONTENT="no-cache">

<!--SparrowTemplate: title
<SPARROW TITLE="Page Title" Buttons="">
<--
<center><font size="+2"><b><INPUT TYPE="IMAGE" NAME="SparrowEdit-0" VALUE="Edit" SRC="img/edit.gif" BORDER="0">
<FIELD TYPE="TEXT" NAME="Header_text_for_this_page"></b></font></center>
-->
                                                :
<!--SparrowTemplate: prioritized_task
<SPARROW TITLE="Prioritized Task" Buttons="addafter delete move indent">
<--
<dt><INPUT TYPE="IMAGE" NAME="SparrowEdit-0" SRC="edit.gif" BORDER="0">
<FIELD TYPE="TOGGLEIMAGE" NAME="Done" SRC="img/check.gif">
<b><FIELD TYPE="TEXT" NAME="priority">:</b>
<FIELD TYPE="TEXT AREA" NAME="description">
<b>[<FIELD TYPE="TEXT" NAME="people">]</b><br>
-->

</HEAD><BODY>
<FORM ACTION=http://sparrow10.parc.xerox.com:8000/servlet/com.xerox.sparrow.Sparrow#sparrow METHOD="POST">

<!--Item-title-1-->
<center><font size="+2"><b><INPUT TYPE="IMAGE" NAME="SparrowEdit-1" VALUE="Edit" SRC="img/edit.gif" BORDER="0">
<!--+-->Web Page Title<!--/--></b></font></center>
<!--//-->

<!--Apply-Item_Format-title--><INPUT TYPE="SUBMIT" NAME="SparrowApplyItemFormat-title" VALUE="Apply title Item
Format"><br><br><!--//-->
                                                :
<!--Item-prioritized_task-1-->
<dt><INPUT TYPE="IMAGE" NAME="SparrowEdit-1" SRC="edit.gif" BORDER="0">
<!--+-->content1<!--/-->
<b><!--+-->content2<!--/-->:</b>
<!--+-->content3<!--/-->
<b>[<!--+-->content4<!--/-->]</b><br>
<!--//-->

<!--Item-prioritized_task-2-->
<dt><INPUT TYPE="IMAGE" NAME="SparrowEdit-2" SRC="edit.gif" BORDER="0">
<!--+-->content1<!--/-->
<b><!--+-->content2<!--/-->:</b>
<!--+-->content3<!--/-->
<b>[<!--+-->content4<!--/-->]</b><br>
<!--//-->

<!--Add-prioritized_task-1--><input type="image" name="SparrowAddBefore-1" value="addBefore" src=http://.../add.gif
border="0"><!--//-->

<INPUT TYPE="SUBMIT" NAME="SparrowApplyItemFormat-prioritized_task" VALUE="Apply prioritized_task Item Format">

<INPUT TYPE="SUBMIT" NAME=SparrowControls-Panel" value="Control Panel">

<INPUT TYPE="SUBMIT" NAME="SparrowApplyPageFormat-" VALUE="Apply Page Format">

</FORM></BODY></HTML>
```

FIG. 4

```
<HTML><HEAD>Normal HTML header mark-up<META HTTP-EQUIV="pragma" CONTENT="no-cache">
<!--SparrowTemplate: title
<SPARROW TITLE="Page Title" Buttons="">
<--
<center><font size="+4"><b><INPUT TYPE="IMAGE" NAME="SparrowEdit-0" VALUE="Edit" SRC="img/edit.gif"
BORDER="0">
<FIELD TYPE="TEXT" NAME="Header_text_for_this_page"></b></font></center>
-->

:

<!--SparrowTemplate: prioritized_task
<SPARROW TITLE="Prioritized Task" Buttons="addafter delete move indent">
<--
<dt><INPUT TYPE="IMAGE" NAME="SparrowEdit-0" SRC="edit.gif" BORDER="0">
<FIELD TYPE="TOGGLEIMAGE" NAME="Done" SRC="img/check.gif">
<b><FIELD TYPE="TEXT" NAME="priority">:</b>
<FIELD TYPE="TEXT AREA" NAME="description">
[<FIELD TYPE="TEXT" NAME="people">]<br>
-->

</HEAD><BODY>

<FORM ACTION=http://sparrow10.parc.xerox.com:8000/servlet/com.xerox.sparrow.Sparrow#sparrow METHOD="POST">

<!--Item-title-2-->
<center><font size="+4"><b><INPUT TYPE="IMAGE" NAME="SparrowEdit-2" VALUE="Edit" SRC="img/edit.gif"
BORDER="0">
<!--+-->Web Page Title<!--/--></b></font></center>
<!--//-->

<!--Apply-Item_Format-title--><INPUT TYPE="SUBMIT" NAME="SparrowApplyItemFormat-title" VALUE="Apply title Item
Format"><br><!--//-->
                                          :
<!--Item-prioritized_task-3-->
<dt><INPUT TYPE="IMAGE" NAME="SparrowEdit-3" SRC="edit.gif" BORDER="0">
<!--+-->content1<!--/-->
<b><!--+-->content2<!--/-->:</b>
<!--+-->content3<!--/-->
[<!--+-->content4<!--/-->]<br>
<!--//-->

<!--Add-prioritized_task-1--><input type="image" name="SparrowAddBefore-1" value="addBefore" src=http://.../add.gif
border="0"><!--//-->

<INPUT TYPE="SUBMIT" NAME="SparrowApplyItemFormat-prioritized_task" VALUE="Apply prioritized_task Item Format"><br>

<INPUT TYPE="SUBMIT" NAME=SparrowControls-Panel" value="Control Panel">

<INPUT TYPE="SUBMIT" NAME="SparrowApplyPageFormat-" VALUE="Apply Page Format"><br>

</FORM></BODY></HTML>
```

FIG. 8

```
<HTML><HEAD>Normal HTML header mark-up<META HTTP-EQUIV="pragma" CONTENT="no-cache">

<!--SparrowTemplate: title
<SPARROW TITLE="Page Title" Buttons="">
<--
<center><font size="+2"><b><INPUT TYPE="IMAGE" NAME="SparrowEdit-0" VALUE="Edit" SRC="img/edit.gif"
BORDER="0">
<FIELD TYPE="TEXT" NAME="Header_text_for_this_page"></b></font></center>
-->

:

<!--SparrowTemplate: prioritized_task
<SPARROW TITLE="Prioritized Task" Buttons="addafter delete move indent">
<--
<dt><INPUT TYPE="IMAGE" NAME="SparrowEdit-0" SRC="edit.gif" BORDER="0">
<FIELD TYPE="TOGGLEIMAGE" NAME="Done" SRC="img/check.gif">
<b><FIELD TYPE="TEXT" NAME="priority">:</b>
<FIELD TYPE="TEXT AREA" NAME="description">
<b>[<FIELD TYPE="TEXT" NAME="people">]</b><br>
-->

</HEAD><BODY>

<FORM ACTION=http://sparrow10.parc.xerox.com:8000/servlet/com.xerox.sparrow.Sparrovw#sparrow METHOD="POST">

<!--Item-title-2-->
<center><font size="+2"><b><INPUT TYPE="IMAGE" NAME="SparrowEdit-2" VALUE="Edit" SRC="img/edit.gif"
BORDER="0">
<!--+-->Web Page Title<!--/--></b></font></center>
<!--//-->

<!--Apply-Item_Format-title--><INPUT TYPE="SUBMIT" NAME="SparrowApplyItemFormat-title" VALUE="Apply title Item
Format"><br><br><!--//-->

:

<!--Item-prioritized_task-3-->
<dt><INPUT TYPE="IMAGE" NAME="SparrowEdit-3" SRC="edit.gif" BORDER="0">
<!--+-->content1<!--/-->
<b><!--+-->content2<!--/-->:</b>
<!--+-->content3<!--/-->
<b>[<!--+-->content4<!--/-->]</b><br>
<!--//-->

<!--Add-prioritized_task-1--><input type="image" name="SparrowAddBefore-1" value="addBefore" src=http://.../add.gif
border="0"><!--//-->

<INPUT TYPE="SUBMIT" NAME="SparrowApplyItemFormat-prioritized_task" VALUE="Apply prioritized_task Item Format"><br>

<INPUT TYPE="SUBMIT" NAME="SparrowApplyPageFormat-" VALUE="Apply Page Format"><br>

<INPUT TYPE="SUBMIT" NAME=SparrowControls-Panel" value="Control Panel"><!--//-->

</FORM></BODY></HTML>
```

FIG. 9

```
<HTML><HEAD> Normal HTML header mark-up <META HTTP-EQUIV="pragma" CONTENT="no-cache">
           :
<!--SparrowTemplate: title
<SPARROW TITLE="Page Title" Buttons="">
<--
<center><font size="+2"><b><INPUT TYPE="IMAGE" NAME="SparrowEdit-0" VALUE="Edit" SRC="img/edit.gif"
BORDER="0">
<FIELD TYPE="TEXT" NAME="Header text for this page"></b></font></center>
-->
           :
<!--SparrowTemplate: prioritized_task
<SPARROW TITLE="Prioritized Task" Buttons="addafter delete move indent">
<--
<dt><INPUT TYPE="IMAGE" NAME="SparrowEdit-0" SRC="edit.gif" BORDER="0">
<FIELD TYPE="TOGGLEIMAGE" NAME="Done" SRC="img/check.gif">
<b><FIELD TYPE="TEXT" NAME="priority">:</b>
<FIELD TYPE="TEXT AREA" NAME="description">
<FIELD TYPE="PAGE LINK" NAME="URL">
<b>[<FIELD TYPE="TEXT" NAME="people">]</b><br>
-->

</HEAD><BODY>
           :
<!--Item-title-5-->
<center><font size="+2"><b><INPUT TYPE="IMAGE" NAME="SparrowEdit-5" VALUE="Edit" SRC="img/edit.gif"
BORDER="0">
<!--+-->Web Page Title<!--/--></b></font></center>
<!--//-->
           :
<!--Item-prioritized_task-5-->
<dt><INPUT TYPE="IMAGE" NAME="SparrowEdit-5" SRC="edit.gif" BORDER="0">
<!--+-->content1<!--/-->
<b><!--+-->content2<!--/-->:</b>
<!--+-->content3<!--/-->
<!--+-->content4<!--/-->
<b>[<!--+-->content5<!--/-->]</b><br>
<!--//-->
           :
</FORM></BODY></HTML>
```

- 109 (outer frame)
- 110 (title template block)
- 112 (prioritized_task template block)
- 114 (PAGE LINK field)
- 116 (Item-title-5 block)
- 118 (Item-prioritized_task-5 block)

FIG. 11

SYSTEM AND METHOD FOR COPYING FORMATTING INFORMATION BETWEEN WEB PAGES

FIELD

This invention relates generally to electronic documents and, more particularly, to a method and system for copying formatting information between group-editable Web pages.

BACKGROUND

Network environments enable making large quantities of information available to network members using a Web browser, for example. Typically there is a one-way transfer of information from a Web page author to a group of Web page browsers who are able to display the page(s). Modifying the information in a Web page requires that the page author edit the content which defines aspects of the Web page, such as hypertext markup language ("HTML"). Several systems are available for modifying Web page content. Some of these systems present a page author with an editing interface on a Web browser from which the Web page content can be modified. Upon completing the modifications, the modified Web page content is stored at a Web server, for instance, so the updated page can be accessed by network members.

In a collaborative work environment, a plurality of users besides the page author may also desire the capability of modifying Web pages. But as mentioned above, Web pages typically are modified by one author who has access to the Web Page content, which may be stored at a Web server. The "Sparrow" system described in a publication titled "In-Place Editing of Web Pages: Sparrow Community-Shared Documents," Bay-Wei Chang, Xerox Palo Alto Research Center, 3333 Coyote Hill Road, Palo Alto, Calif. 94304, U.S.A., April 1998, which is incorporated herein by reference in its entirety, allows a shared Web page to be modified or augmented by any contributor. Specifically, the Sparrow system allows a user to contribute to a Web page in ways the page author has defined.

In the Sparrow system, a traditional Web page can be converted into a group-editable Web page by adding several additional strings of HTML syntax. The additional strings of syntax include a set of templates and a set of data contributions or items. The templates describe what data contributions the page may include, such as the number and kinds of data fields, and how those contributions will be formatted. An item is a single contribution, formatted according to the rules in one of the templates. Contributors add new contributions, or edit previous contributions, by filling in forms where these forms require no previous knowledge of HTML. With Sparrow, the page author can change the layout of such a page or the format of its items.

But editing the formatting information in a plurality of linked Web-editable pages is often difficult, tedious and expensive. In some systems, the formatting information is stored in the Web pages, requiring that the information in each page be modified manually by a copy/paste operation. This method is time consuming and prone to error. Other systems have attempted to deal with this problem by storing a single copy of the formatting information in a separate database, updating the single copy, and then dynamically creating Web pages using that formatting information in the pages as they are generated and displayed. This approach works, but inhibits the ability to easily copy a page since the formatting information and content are not in a single file. Further, this approach hampers making local customizations of formatting information in individual pages and prevents using standard editors and search engines that work with standard Web pages.

SUMMARY

A system in accordance with embodiments of the present invention includes at least one source page having a first set of formatting information and at least one target page having a second set of formatting information. The system further includes an extraction system that extracts the first set of formatting information from the at least one source Web page, and a formatting system that replaces a portion of the second set of formatting information in the at least one target Web page with a corresponding portion of the first set of extracted formatting information.

A method, a computer readable medium, and a program storage device readable by a machine and tangibly embodying a program of instructions executable by the machine in accordance with embodiments of the present invention includes extracting a first set of formatting information from a source Web page, and replacing a portion of a second set of formatting information in at least one target Web page with a corresponding portion of the first set of extracted formatting information.

The embodiments of the present invention provide an easy way for Web page authors to apply formatting information to one or more Web pages. Additionally, embodiments of the present invention provides a simple interface, such as a form-based Web page, for editors to apply the formatting information. Moreover, formatting information in Web pages can be easily customized.

BRIEF DESCRIPTION OF THE DRAWINGS

FIG. 4 is an exemplary screen print of exemplary HTML code in accordance with embodiments of the present invention;

FIG. 8 is an exemplary screen print of exemplary HTML code in accordance with embodiments of the present invention;

FIG. 9 is an exemplary screen print of exemplary HTML code in accordance with embodiments of the present invention;

FIG. 11 is an exemplary screen print of exemplary HTML code in accordance with embodiments of the present invention.

DETAILED DESCRIPTION

A method and system 10 for copying formatting information between Web pages in accordance with embodiments of the present invention are shown in FIGS. 1-10. In embodiments of the present invention, system 10 includes a web server 12, computers 14(1)-14(n) and network 16. A method includes the web server 12 extracting a first set of formatting information from a source web page 20 displayed on a client in the network 16, such as the computer 14(1), and applying the first set of formatting information to a corresponding second set of formatting information in one or more target Web pages 70(1) associated with the source page 20. The system 10 has a number of advantages, including providing an easy way to apply formatting information from a source Web page 20 to one or more target Web pages, such as page 70(1), without requiring users to manually edit the formatting information in each of the pages.

Figure 1:
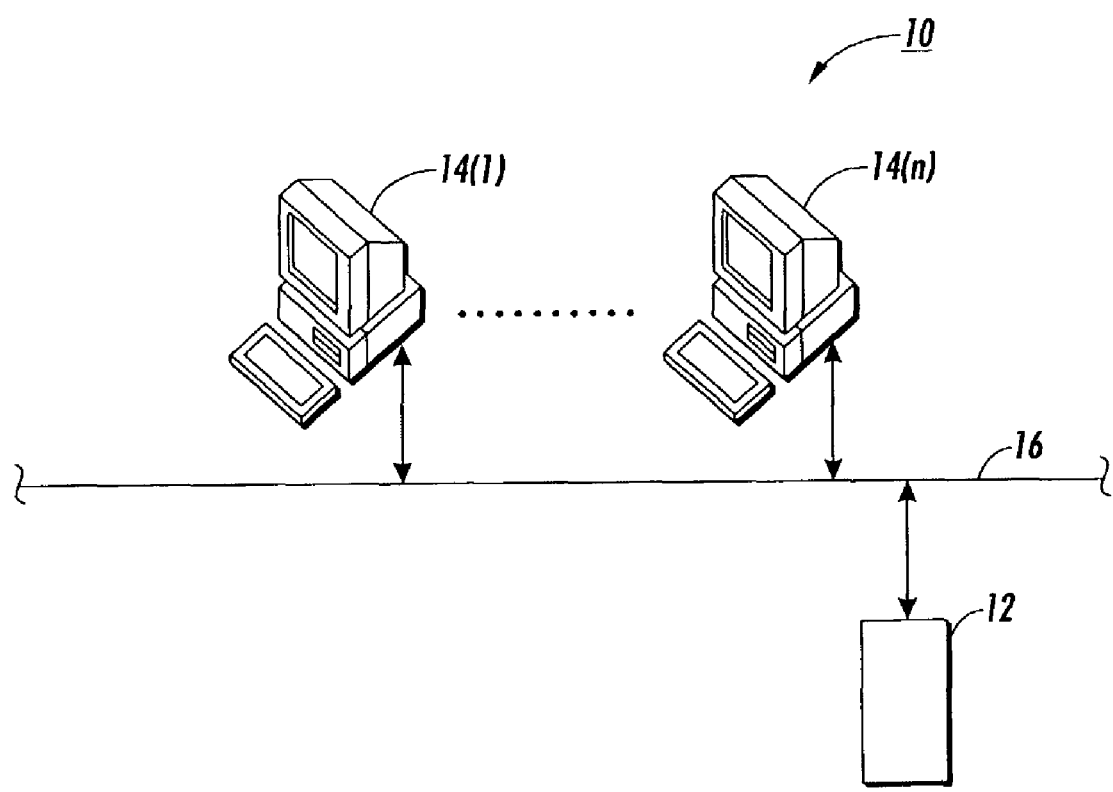
FIG. 1 is a block diagram of a system for copying formatting information between Web pages in accordance with embodiments of the present invention.

Referring more specifically to FIG. 1, the web server 12 comprises a server system with a CPU, memory, and an I/O unit for connecting the web server 12 to the network 16, and hence computers 14(1)-14(n). Although the server 12 is shown, other types of computer systems may be used, such as a software server residing on a computer system. The web server 12 stores in its memory and/or is configured to generate group editable Web pages, as disclosed in U.S. patent application Ser. No. 09/731,912 to Eric Allan Bier, titled "SYSTEM AND METHODS FOR EDITING A WEB PAGE," filed Dec. 8, 2000, which is hereby incorporated by reference in its entirety.

Further, the web server 12 is configured to service one or more requests from one or more devices on the network 14, such as computers 14(1)-14(n), to generate and/or send group editable Web pages as described and illustrated herein in accordance with embodiments of the present invention, although the server 12 may send conventional Web pages and perform other types of functions, such as network routing. These Web pages may be coded using HTML, although a number of other markup languages may be used, such as XML, XHTML, and Javascript. Moreover, the web server 12 may also process data transmitted from one or more of the computers 14(1)-14(n) through the group editable Web pages using Java servlets in accordance with embodiments of the invention, although CGI scripts or other kinds of servlets may also be used.

Computers 14(1)-14(n) each include a processor, an I/O unit, a memory, mechanisms for reading data stored in the memory, user input devices, such as a keyboard and a mouse, and a display device, which are coupled together by one or more buses, although other coupling techniques may be used. The memory stores instructions and data for performing the present invention for execution by the processor, although some or all of these instructions and data may be stored elsewhere, such as the server 12. The I/O unit in each of computers 14(1)-14(n) is connected to the network 16 and has one or more ports capable of sending and receiving data to and from the network. Since devices, such as computers 14(1)-14(n), are well known in the art, the specific elements, their arrangement within computers 14(1)-14(n) and operation will not be described in detail here.

Each of the computers 14(1)-14(n) are configured to enable users to request group editable Web pages from the web server 12, and further to display the pages, although the computers 14(1)-14(n) may be capable of performing other types of functions. Accordingly, each of computers 14(1) has stored in its respective memory and operates a standard Web browser application, such as Internet Explorer™, which is used by the computers 14(1)-14(n) to display and transmit data through the group editable Web pages sent from the server 12, although other types of browser applications may be used including Netscape Navigator™ or Opera™. Additionally, group-editable web pages in accordance with embodiments of the present invention can be for a variety of purposes, such as for advertising homework assignments, personnel directories (e.g., students, faculty), sortable "to do" lists, a meeting scheduler, event logger, talk announcements, project management, URL sharing, co-authoring documents, requesting comments, preparing and managing sign-up sheets, weighted voting, or a group home page, for example.

Network 16 comprises a public network, such as the Internet, which may include one or more local area networks ("LANs"), such as Ethernet™ networks, wide area networks ("WANs") and telephone line networks, although other types of public or private networks may be used, such as a proprietary organizational network spread out over several geographical locations. Further, network 16 enables the computers 14(1)-14(n) to communicate with the server 12 and any other devices with access to the network 16.

The devices in network 16, such as Web server 12, computers 14(1)-14(n), are provided for exemplary purposes only. In embodiments of the present invention, these devices may comprise other types of devices or systems that can store, process and execute instructions for performing one or more methods of the present invention as will be described in further detail herein. By way of example only, the devices shown in FIG. 1 may also comprise laptop computers, personal digital assistants, cellular telephones or other devices.

Figure 2:
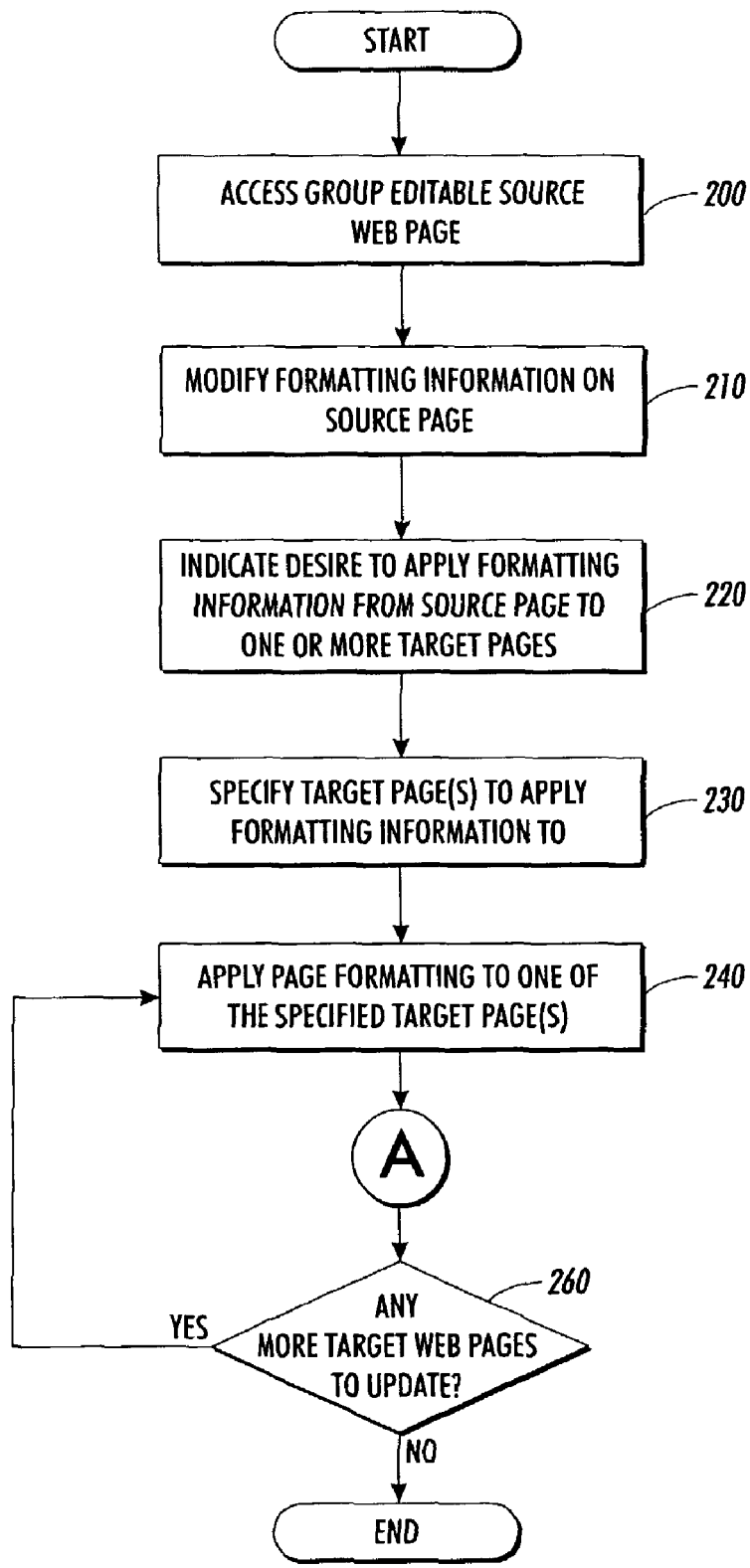
FIG. 2 is a flow chart of a process for copying formatting information between Web pages in accordance with embodiments of the present invention.

The operation of the system 10 for copying formatting information between group editable Web pages in accordance with embodiments of the present invention will now be described with reference to FIGS. 2-10. Referring specifically to FIG. 2 and beginning at step 200, by way of example only, a user at one of the devices on the network 16, such as the computer 14(1), via an input device, and with the cooperation of the computer 14(1) I/O unit, memory, processor, and the browser, requests a group editable Web page 20, shown in FIG. 3, from the web server 12.

Figure 3:
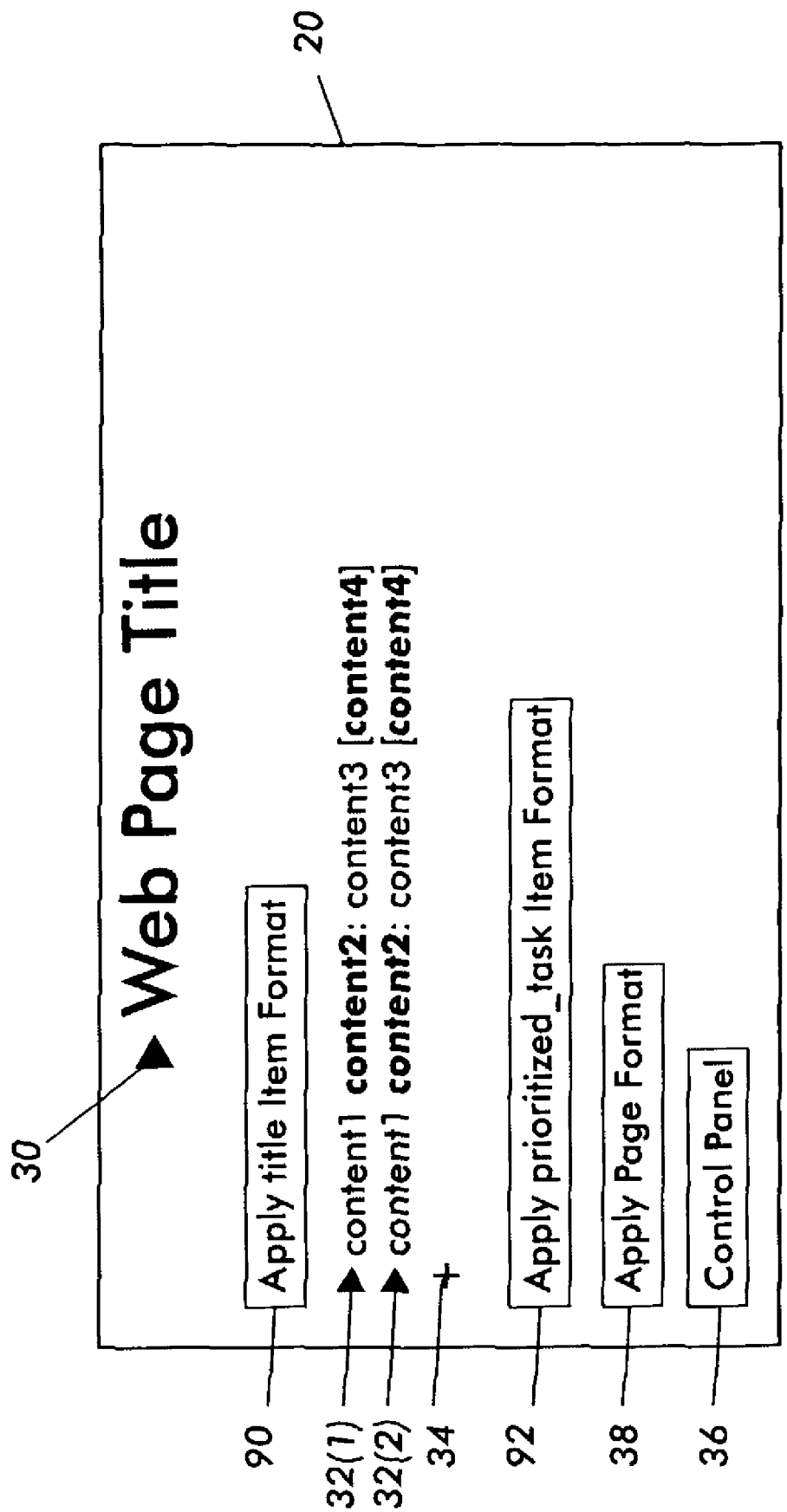
FIG. 3 is an exemplary screen shot illustrating an exemplary Web page in accordance with embodiments of the present invention.

In particular, and referring to FIG. 3, a user can, for example, enter a URL in a Web browser (not illustrated) which retrieves a specific web page 20 from the web server 12. If the retrieved web page 20 is group editable, which in this example it is, a user then has the option of editing one or more of the items, templates, or overall HTML that defines the page 20, such as the data content, data layout, and overall formatting of the page. The exemplary group-editable web page 20 acts as a shared page whose content can be edited by one or more page contributors. The web page 20 includes several selectable portions 30, 32(1), 32(2), 34. Specifically, by selecting one or more of the "▶" buttons 30, 32(1), 32(2) within the page 20, a user can edit the content item associated with that button. By selecting the "+" button 34, a user can add a new content item above the button 34 on the page 20. By way of example only, a user may desire modifying the formatting information associated with the content in Web page 20.

Referring to FIG. 4, the code 21, such as HTML, that is sent from server 12 and used by the computer 14(1) in conjunction with the browser application operating thereon to generate the Web page 20 is shown. The exemplary code 21 is broken down into its respective elements, or element identifiers. Specifically, the code 21 includes two formatting templates, such as a title template 40 and a prioritized_task template 42, although a greater or lesser number of templates may be used. Additionally, the code 21 includes a form identifier 44 that calls an identified Java servlet on the Web server 12 that allows for group-editing of the page 20, items 46, 48(1), 48(2), button definition section 49 that allows, for example, adding of a prioritized_task list item in this exemplary embodiment, although other types of servlets or CGI scripts may be used.

Knowing this overall structure of a page, the server 12 can identify the various components of the web page 20, and then selectively display portions for editing. However, it is to be appreciated that while the exemplary embodiments have been described in relation to HTML and web pages, the systems and methods of this invention can be applied to any electronic document or computer language comprising identifiable portions that can be selected for editing, such as the HTML family of languages and XML, and which have the capability of having textual comments included in the source that are invisible to the reader of the document, the ability to send form data to a server, and the ability to display clickable buttons.

Accordingly, at step 210, a user, such as a page author, optionally selects the control panel button 36 on the Web page 20 to request the server 12 for access to a template editing interface for modifying the formatting code of the Web page 20 to control the characteristics of the overall page as well as the organization of content within that page, as disclosed in U.S. patent application Ser. No. 09/731,912 to Eric Allan Bier, titled "SYSTEM AND METHODS FOR EDITING A WEB PAGE," filed Dec. 8, 2000, which has already been incorporated by reference in its entirety. It should be appreciated that the Web page 20 may be linked to several other Web pages that have differently formatted corresponding content. Thus, it is not necessary for the page author to modify the Web page 20 formatting code before performing the methods in accordance with embodiments of the present invention as described herein.

In response, the web server 12 parses the code 21 of the web page 20 to determine the one or more formatting templates in use. Upon determination of the templates 40, 42 in use, the server 12 determines which items, such as items 46, 48(1), 48(2), are associated with the one or more identified templates. The server 12 creates and forwards a temporary web page (not illustrated) to the computer 14(1), which allows for editing of the template. A user then may edit one or more of the templates 40, 42 in the code 21 using a graphical user interface displayed in the browser for assisting in the template editing process, although text editors for directly editing the HTML code may be used.

The first part of each of the templates 40, 42 includes a <SPARROW...> tag, which includes parameters that define what buttons will be available in an item editing dialog box (not illustrated) that will appear when the user edits an item based on the template, as well as operations for adding another item after this item, deleting this item, moving this item up or down in the item order, indenting this item, whether other items can be included, whether others will be notified when this item is changed, and who should be notified when the changes are made.

The second part of the templates 40, 42 is a string of formatting code, such as HTML, describing how an item based on this template will appear. In addition to a normal set of HTML tags, this string may also include a <FIELD...> tag representing an item of information that will be provided by the user when an item based on the template is added to the page. The TYPE attribute of the field tag regulates, for example, the type of information that a user will be asked to provide, the type of form elements a user will be given to provide this information, such as type-in fields, text areas, pull-down menus, check boxes, or the like, and how the information will be formatted once the item has been added. Thus, the page author can edit either or both of the two separate parts of this template. Once the page author has completed editing, the page author at the computer 14(1) indicates to the server 12 that the editing is completed by selecting an OK button, for instance, which is displayed along with the template editing interface. Accordingly, the web server 12 updates the web page so as to include the edited templates and updates the items 46, 48(1), 48(2), on the page that are based on the revised template(s) 40, 42. The server 12 then sends a web page with the edited formatting information to the computer 14(1) for display.

For ease of discussion and by way of example only, the formatting information included in the templates 40, 42 that form part of the code 21 for web page 20, as shown in FIGS. 3-4, have been modified using the above-described process. But a user at computer 14(1) may desire updating the formatting information in one or more other web pages that may be associated with the Web page 20. For example, where the web page 20 may be associated with one or more other pages for a common purpose, such as project management, and thus the page author may desire all or particular pages to have the same formatting characteristics for consistency.

Figure 5:
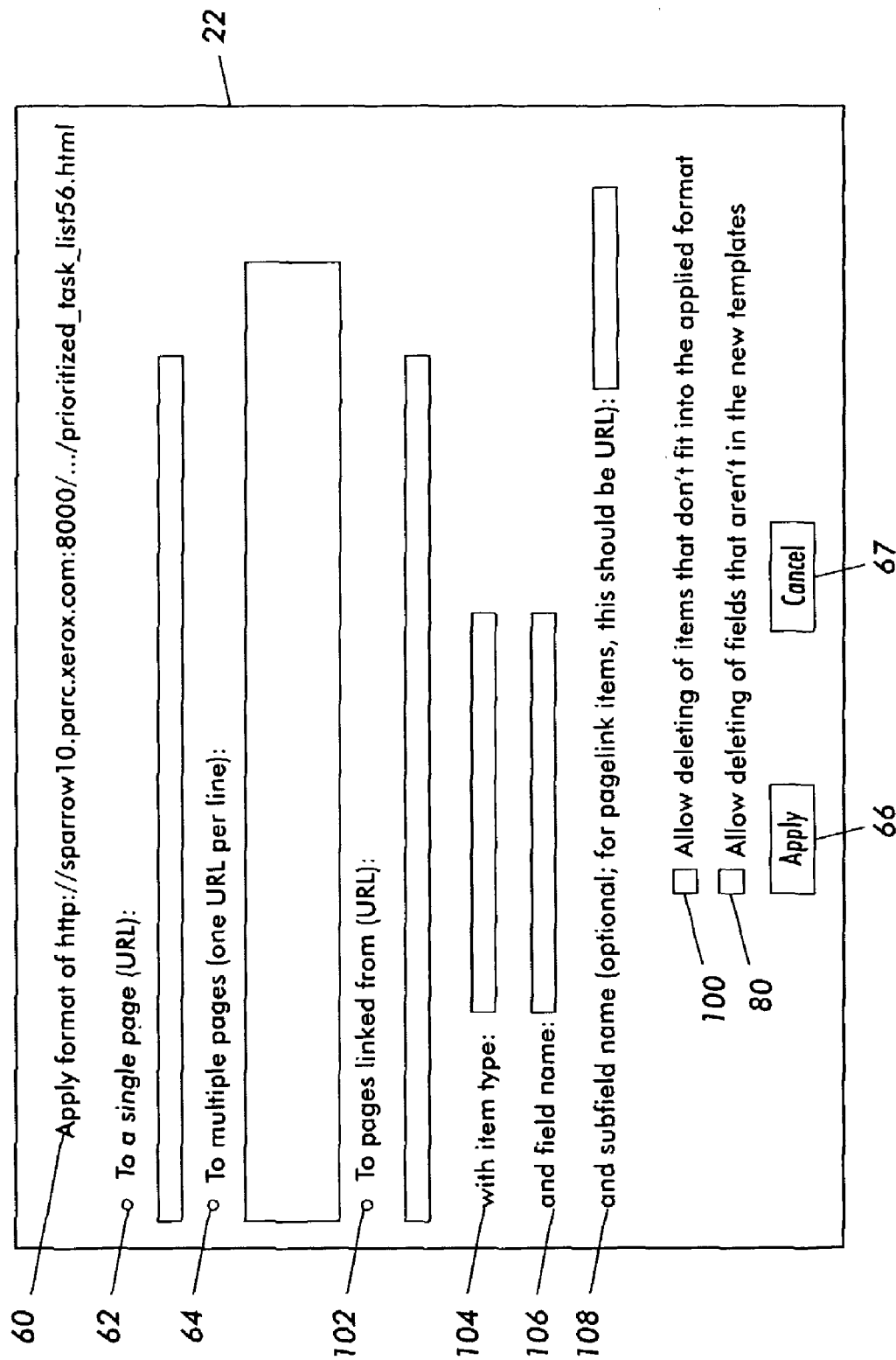
FIG. 5 is an exemplary screen shot illustrating an exemplary Web page form in accordance with embodiments of the present invention.
Figure 6:
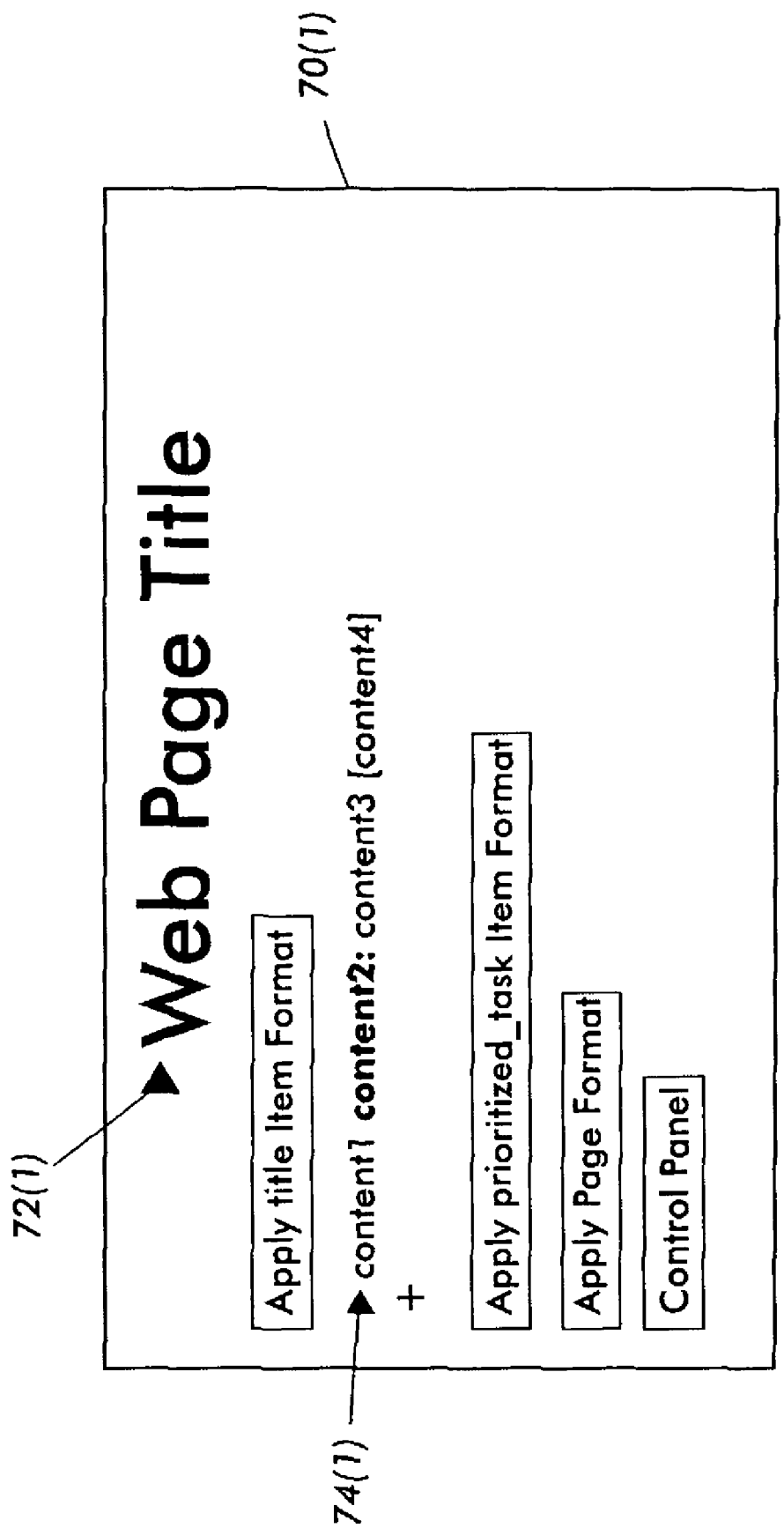
FIG. 6 is an exemplary screen shot illustrating an exemplary Web page in accordance with embodiments of the present invention.
Figure 7:
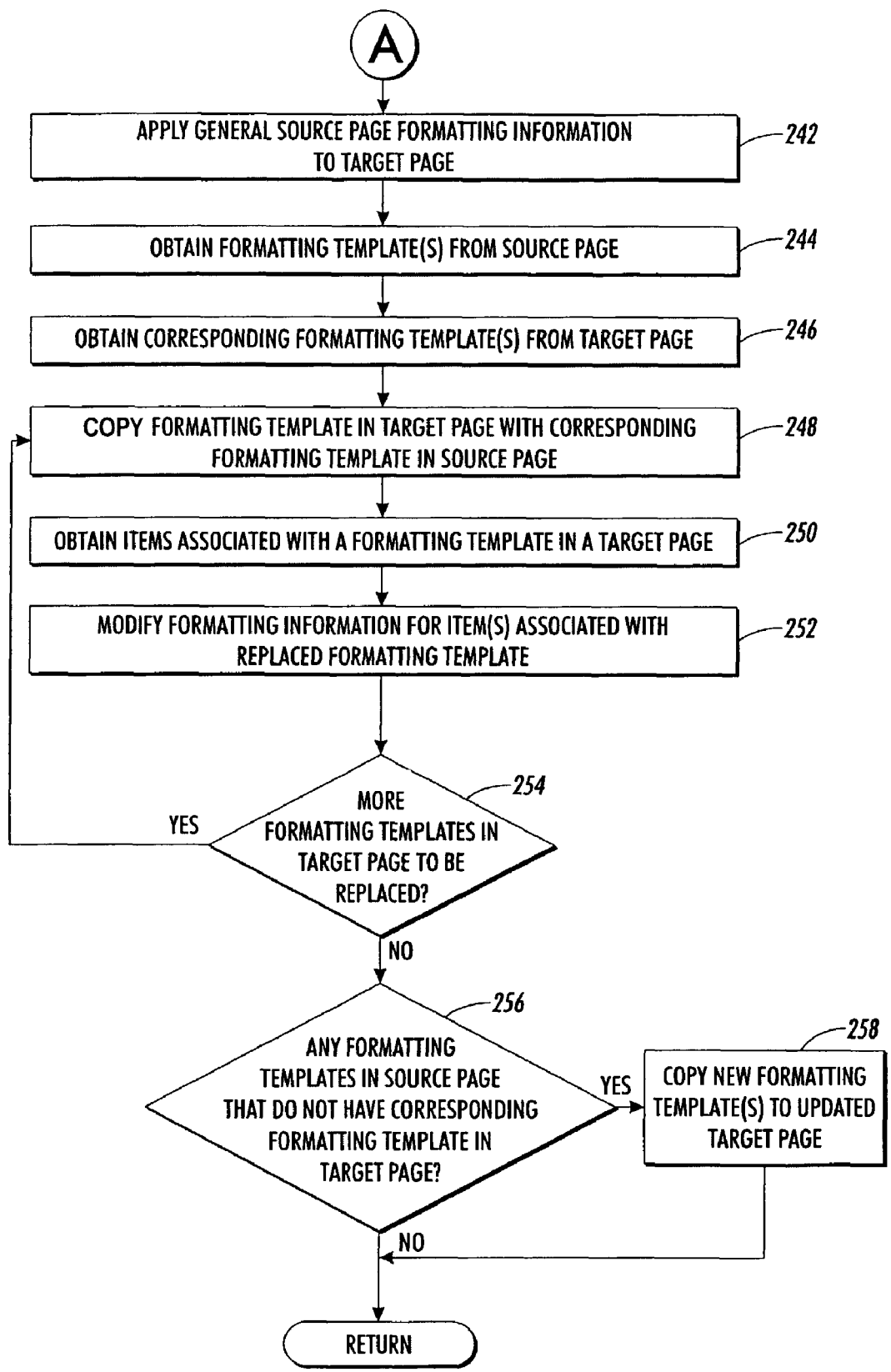
FIG. 7 is a flow chart of a process for copying formatting information between Web pages in accordance with embodiments of the present invention.

Accordingly, at step 220, and referring to FIGS. 5-6, with reference back to FIGS. 3-4, the user selects an apply page format button 38, although an anchor tag may be used instead of a button. Referring to FIG. 4, the apply page format section 54 of the code 21 supporting the button 38 causes the computer 14(1) to send a request to the server 12 that the formatting information from the page 20 be applied to one or more other web pages. Moreover, the section 44 identifies a Java servlet on the server 12 for servicing the apply format request, although the section 44 may identify a CGI script or other types of servlets.

In response, at step 230, the server 12 sends a form page 22 to the computer 14(1), as shown in FIG. 5. The form page 22 is created using standard HTML, although other markup languages may be used. The form page 22 enables a user to specify which target pages(s) upon which formatting information obtained from the source page 20 should be applied. In particular, the page 22 shows the address 60, such as a URL, of the page 20 where the formatting information will be obtained from. Further, a user may select the radial button 62 to specify in the associated text field that the formatting information from page 20 should be applied to one particular page, or the button 64 to specify multiple pages in the associated text block field to apply the formatting information on. Users may specify additional options that will be described in further detail herein below in accordance with embodiments of the present invention. The server 12 is configured to accept the data input using the form page 22 and to utilize the data as described herein.

Figure 10:
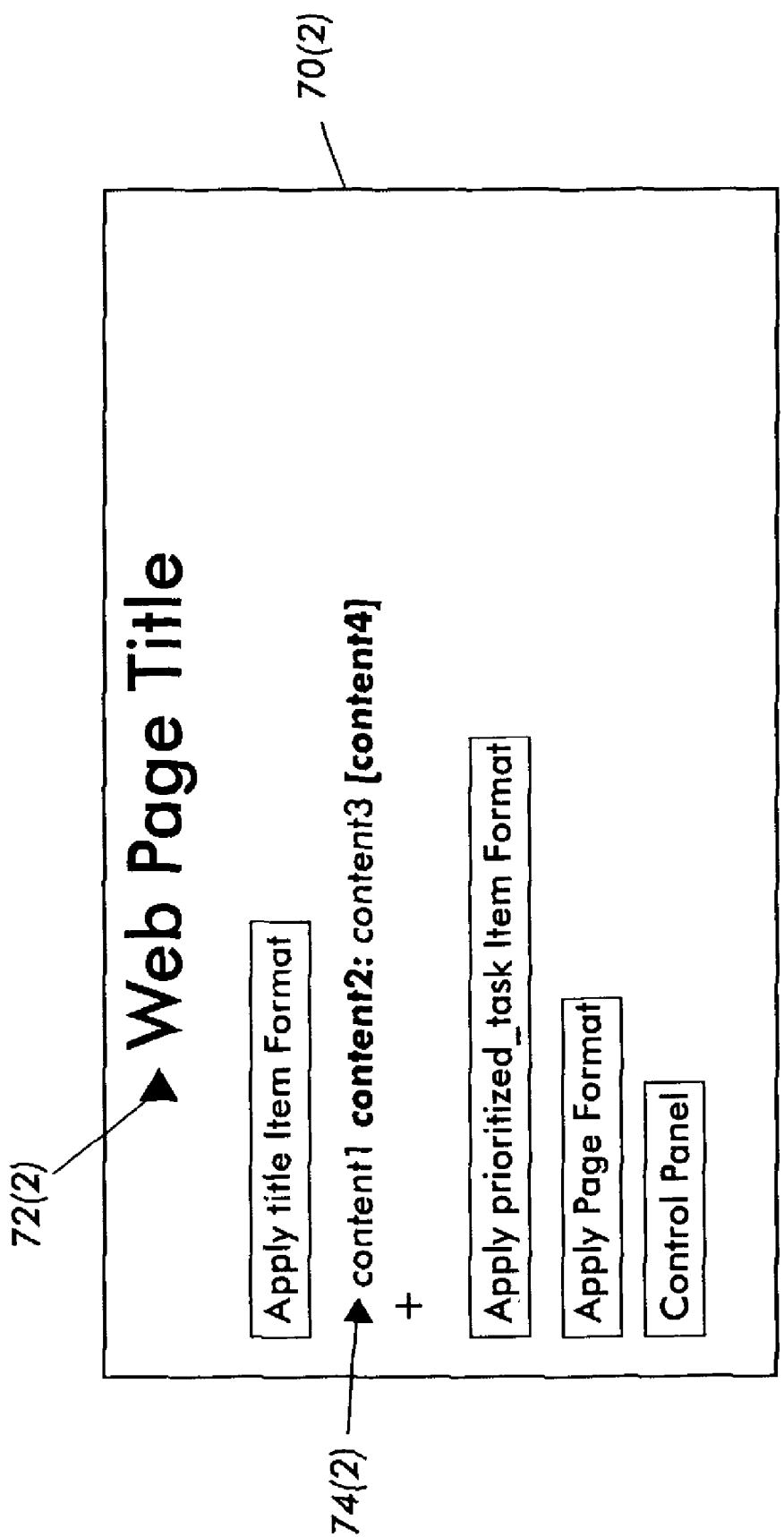
FIG. 10 is an exemplary screen shot illustrating an exemplary Web page in accordance with embodiments of the present invention.

By way of example only, a user at computer 14(1) enters a URL (not illustrated) for one page in the text field associated with the radial button 62. Referring to FIG. 6, an exemplary target Web page 30(1) located at the URL specified by the user in the text field associated with the radial button 62 is shown. The target page 70(1) is the same as the source page 20, except that the content associated with the buttons 72(1), 74(1) is formatted differently, and the content itself and the number of content items may be different. For instance, the font size of the "Web Page Title" content associated with the button 72(1) in the target page 70(1) is larger than the corresponding "Web Page Title" content font size associated with the button 30 on the source page 20. It should be appreciated that in embodiments of the present invention, while the content associated with the page titles (i.e., "Web Page Title") are illustrated in FIGS. 3, 6, 10 as being the same, they may be different. For instance, the title of the page 20 in FIG. 3 may instead read "Page 1" while the title of the page 70(1) in FIG. 6 may read "Page 2."

Moreover, the content "[content4]" associated with the button 74(1) in target page 70(1) is not in bold, whereas the corresponding content "[content4]" associated with the buttons 32(1), 32(2) in target page 20 is in bold. It should be appreciated while just the one content item associated with button 74(1) is shown in FIG. 6, there may be a greater number of items. Thus, in this example the user desires that the target page 70(1) be formatted in the same manner as the source page 20. Accordingly, the user selects the apply button 66 shown in FIG. 5 to cause the computer 14(1) to send the form page 22 information to the server 12 for further processing as described herein, although the user may select the cancel button 67 to call off applying the formatting information to the one or more other pages.

Accordingly, at step 240, the server receives the form page 22 information and begins the process of applying the formatting information from the source page 20 to the specified target page 70(1) as described herein.

In particular, referring to FIGS. 7-10 and beginning at step 242, with reference back to FIG. 4, the web server 12 parses the code 21 of the web page 20 to extract general formatting information from the source Web page 20, such as background color information, corporate logos, horizontal rules, control panel buttons, add item buttons, for the page 20, for instance, and stores the information in a temporary memory location for further processing as described herein. The server 12 copies the contents of the target page code 71(1) into a temporary file so that the server 12 may refer to portions of the code 71(1) during ensuing processing steps as described further herein or in case the formatting copy operation fails and the original version of the target page code 71(1) is desired, although the code 71(1) contents may be stored in temporary memory buffer(s). Further, the server 12 clears the contents of the file where the target web page code 71(1) contents are stored, and copies the extracted general formatting information into the temporary memory file to begin creating the updated target page code 71(2) upon which an updated target page 70(2) is generated, as shown in FIGS. 9-10.

At step 244, the web server 12 continues to parse the source page code 21 to extract one or more formatting templates that may be present in the code 21. In this example, the server 12 determines that the associated code 21 of source page 20 has templates 40, 42 defined therein, and the server 12 extracts the template identifier for each of the templates 40, 42, such as the "title" and the "prioritized_task" identifiers, respectively. The server 12 stores the templates and the associated identifier information in the temporary file mentioned above in connection with step 242, although the information may be stored in another temporary file or as an array of records in a memory buffer, for example.

At step 246, web server 12 parses the code 71(1) associated with the web page 70(1) to extract one or more formatting templates that may be present in the target page code 71(1) which correspond to one or more formatting templates in the source page code 21. For each formatting template present in the code 71(1), the server 12 examines the identifier of each formatting template included in the source page code 21 to find a match. In this example, the server 12 determines that the target page code 71(1) has templates 73(1), 75(1) defined therein, which correspond to the templates 40, 42 defined in the source page code 21. The server 12 extracts the template identifier for each of the templates in the target code 71(1) that correspond to a template in the source page code 21, such as the "title" and the "prioritized_task" identifiers associated with the templates in the code 71(1) in this example, and stores the identifiers in a memory, although the target code 21 may have a lesser or greater number of templates defined therein. The templates and the associated identifier information are stored in the temporary file mentioned above in connection with step 242 for further processing, although the information may also be stored in another temporary file or as an array of records in a memory buffer, for example. If the server 12 does not find any templates in the target code 71(1) that correspond to any templates in the source page code 21, then the server 12 sets a flag for further processing as described herein.

At step 248, the web server 12 copies the first template from the source page code 21, such as the "title" template 40, into the file with the updated code 71(2), which is shown as updated "title" template 73(2) in FIG. 9.

At step 250, the web server 12 parses the temporary file that includes the content copied from the target page code 71(1) file at step 242 to determine which content items are associated with the "title" formatting template 73(1). Thus, the server 12 finds one item 76(1) in the code 71(1) that is associated with the template, although there may be a lesser or greater number of associated items. Where there is more than one associated item, this step is repeated for each item. The found item(s) are stored in the temporary file mentioned above in connection with step 242, although the information may be stored in another temporary file or as an array of records in a memory buffer, for example.

At step 252, the web server 12 modifies the associated item(s) found above at step 250, item 73(1) in this example, to include the updated formatting information based on the edited associated formatting templates from the source Web page 21. In particular, the server 12 creates the updated content item 76(2) based upon the associated updated formatting template 73(2). Since it is possible for the ordering of the data fields within one or more of the templates 40, 42 to change during the editing process described above at step 210, the server 12 is configured to maintain the proper ordering of the content that is taken from the item 76(1) and applied to the updated formatting template 73(2) in creating updated item 76(2).

The server 12 does this by examining each of the field tag names in the original template 73(1) contained in the temporary file storing the target page code 71(1). For example, the template 73(1) includes the field tag name "Header_text_for_this_page." For the item 76(1), the content corresponding to each field tag name identified in the template 73(1) is stored together in the server 12 memory in a look-up table, for example. Thus, as the content from the data field in item 76(1) is applied to the updated formatting templates 73(2) to create an updated item 76(2), the server 12 references this look up table to apply the content to the template in the proper order. Moreover, as the updated template 73(2) is applied to the data fields extracted from the item 76(1), the content is associated with the updated formatting information obtained from the updated source page 21.

In this embodiment, if one or more <FIELD> tags are missing from the updated template 73(2) that was present in the original template 73(1), the server 12 will not immediately update all the items to reflect the updated template and create updated item 76(2). Instead, the server 12 will cause the computer 14(1) to prompt the user to confirm that it is acceptable to discard any information stored in the items that belong to the deleted template field. If the user confirms that this loss of information is intended, the items will be deleted. However, if at step 230 the user selected the "allow field deletion" checkbox 80 in the form page 22 shown in FIG. 5, the server 12 will not cause the computer 14(1) to prompt the user and the data that corresponds to the missing field tags will be discarded.

At decision box 254, if there is another formatting template in the target page code 71(1) to be updated, the YES branch is followed and steps 248-254 are repeated as described above, except the steps are performed with respect to the other template, such as the "prioritized_task" template 75(1) and associated item 78(1) to create update formatting template 73(2) and updated item 78(2). If there are no more formatting templates left to be updated, the NO branch is followed.

At decision box 256, if the flag is set above at step 246, which indicates that there are no formatting templates in the target page code 71(1) which correspond to any templates in the source page code 21, the YES branch is followed and step 258 is performed as described herein. But if the flag is not set, the NO branch is followed and the process proceeds to decision box 260 as described further herein below.

At step 258, the new formatting templates from the source page code 21 which do not have corresponding templates in the target page code 70(1) are copied into the file containing the updated target page 71(2). The updated target page code 71(2) may be accessed by devices on the network, such as the computers 14(1)-14(n). Devices on the network, such as the computer 14(1), access the code 71(2) and may display the updated target page 70(2), as shown in FIG. 10. In particular, the content associated with the buttons 72(2), 74(2) in the updated target page 70(2) now appear to be formatted in the same manner as the corresponding content in the source page 20. For instance, the font size of the "Web Page Title" content associated with the button 72(2) in the target page 70(2) is the same size as the corresponding "Web Page Title" content font size associated with the button 30 on the source page 20. Moreover, the content "[content4]" associated with the button 74(2) in target page 70(2) is in bold like the corresponding content "[content4]" associated with the buttons 32(1), 32(2) in target page 20. Thus, in this example the user's desire that at least one of the specified target pages 70(2) be formatted in the same manner as the source page 20 has been met.

Referring back to FIG. 2, at decision box 260, if the user selected the radial button 62 in the form page 22 to specify that the formatting information from page 20 should be applied to one particular target page, or the user selected the button 64 to specify multiple pages to apply the formatting information to but all of the specified target pages have been updated, the NO branch is followed and the process ends. If the user selected the button 64 to specify multiple pages to apply the formatting information to, and there is one or more target pages that were specified as needing updating but were not updated, the YES branch is followed and steps 240-260 are repeated as described above, except the server 12 updates the next specified target page.

An alternative embodiment of system 10 will now be described with reference to FIGS. 1-10. In this embodiment, steps 200-260 are performed as described above, except at step 220, and referring to FIG. 3, the user selects one of the apply item format buttons 90, 92, although an anchor tag may be used instead of a button. In this example, the user selects the apply "prioritized_task" item format button 92, although the user may also select the button 90. Referring to FIG. 4, the apply item format section 94 of the code 21 supporting the button 92 causes the computer 14(1) to send a request to the server 12 that the formatting information associated with the items 32(1), 32(2) from the page 20 be applied to one or more other web pages. Moreover, the section 94 identifies a Java servlet on the server 12 for servicing the apply item format request, although the section 94 may identify a CGI script or other types of servlets. Steps 230-260 are performed thereafter, except that just the "prioritized_task" formatting template 75(1) and its associated "prioritized_task" item 78(1) in the target page code 71(1) are modified according to the formatting template 42 in the source page code 21.

An alternative embodiment of system 10 will now be described with reference to FIGS. 1-10. In this embodiment, steps 200-260 are performed as described above, except at step 230, and referring to FIG. 5, a user may select the "Allow deleting of items" checkbox 100 to instruct the server 12 that during performance of ensuing steps 240-260, if there are templates in the target page code 71(1) that do not correspond to any template in the source page code 21, the templates and their associated items are not to be included in the updated target page code 71(2), since the server 12 will copy just the formatting templates included in the source page code 21 into the updated target page code 71(2). Moreover, during performance of steps 240-260, if there are regions of items in the target page that are not in the source page, either the server 12 halts operation without updating the target page and the user is warned, or if the user has selected the checkbox 100, then those items are discarded. If there are multiple regions of the same type of content items in the target page, they are placed in the new format in the order they appear.

An alternative embodiment of system 10 will now be described with reference to FIGS. 1-10. In this embodiment, steps 200-260 are performed as described above, except at step 230 and referring to FIG. 5, the user selects the button 64 and specifies in the associated text block field a first URL representing the location of a first target page 70(1) and a second URL representing the location of a second target page (not illustrated) to apply the formatting information on. Thereafter, steps 240-260 are performed as described above and the formatting templates 40, 42 in the source page 21 are copied into the first target page 70(1) and the second target page, and the items 76(1), 78(1), 116, 118 in each target page, respectively, are reformatted based upon the corresponding template in each of the target pages.

An alternative embodiment of system 10 will now be described with reference to FIGS. 1-11. In this embodiment, steps 200-260 are performed except as described herein. Referring to FIG. 5, at step 230, the user selects the button 102 and specifies in the associated text block field an URL representing the location of a target page 109, shown in FIG. 11, which has links to one or more target pages upon which the formatting information should be applied to from the source page 21. In this embodiment and still referring to FIG. 5, the user may specify in the text field 104 items associated with a formatting template type, such as the "prioritized_task" formatting template 112, shown in FIG. 11. The user may also specify a field name of one of the fields in the template 112, such as "URL," in the text field 106 that may contain a location of a target page. Moreover, the user may specify an optional subfield name in the text area 108 for further identifying any subfields associated with the field name entered in the text field 106 that may contain a URL of a target page. Thus, at step 246, and referring to FIG. 11, the server 12 will analyze the templates 110, 112 in the target page code 109. In particular, the server 12 looks at the template identifiers to see whether they match the item type entered in the text area 104.

In this example, the server 12 finds the "prioritized_task" formatting template 112, which matches the text entered in the area 104, and further analyzes this formatting template. Next, the server 12 skips step 248, but performs step 250 to obtain the items in the page code 109 that are associated with the template 112, in this example item 118, although there may be a lesser or greater number of items associated with the template 112. Next, the server 12 extracts the content associated with the field in the item 118 that was specified in the field name text area 106 shown in FIG. 5. In this example, the field name specified in the text area 106 was "URL," and thus the server 12 extracts the content associated with the "URL" field 114 in the template 112 from the corresponding location in the item 118 which is associated with the template 112. Here, the portion of the item 118 having the "content4," which is associated with the "URL" field 114 in template 112, will have an address, such as a URL, of a target Web page, such as of the target page 71(1), upon which formatting information from the source Web page 20 should be applied. Steps 242-258, and 260 are then performed in connection with each target Web page identified in the process described above to apply the formatting information on.

While particular embodiments have been described above, alternatives, modifications, variations, improvements, and substantial equivalents that are or may be presently unforeseen may arise to applicants or others skilled in the art. Accordingly, the appended claims as filed, and as they may be amended, are intended to embrace all such alternatives, modifications, variations, improvements, and substantial equivalents. Further, the recited order of processing elements or sequences, or the use of numbers, letters, or other designations therefor, is not intended to limit the claimed processes to any order except as may be specified in the claims.

What is claimed is:

1. A document formatting system comprising:
   a server device including a processing unit, a memory, and an input-output unit, the memory comprising instructions which when executed by the processing unit implement:
   an extraction system in the server device that extracts from a source page selected based on an operator input (a) a first set of formatting information that is interpreted by a markup format interpreter and (b) a first set of formatting templates embedded in a code of the source page; and
   a formatting system in the server device that replaces in a target page selected based on an operator input (a) a portion of a second set of formatting information in the target page that is interpreted by a markup format interpreter with a corresponding portion of the first set of extracted formatting information and (b) at least one formatting template in a second set of formatting templates in the target page associated with at least one formatting template in the first set of extracted formatting templates,
   wherein each of the formatting templates includes at least one formatting rule,
   wherein the source page and the target page include at least one of the formatting rules that is embedded in comments that are ignored by the markup format interpreter,
   wherein the formatting rules control how data items defining at least a portion of content on the source page and the target page are formatted,
   wherein the formatting system reformats each data item associated with one of the formatting templates that has been replaced in the second set of formatting templates, and
   wherein the first set of formatting templates comprises at least one formatting template comprising at least one string of formatting code including at least one of a set of tags and a type attribute for regulating a type of information that a user can provide and a type of form elements the user will be presented with to provide the information.

2. The system of claim 1 wherein at least one of the formatting rules from the source page is copied into the target page and used to control how at least one type of data item on the target page is to be formatted.

3. The system of claim 2 wherein the formatting system reformats all data items of the at least one type in the target page in accordance with the at least one copied formatting rule.

4. The system of claim 2 wherein all data items of the at least one type that are added to the target page after the at least one formatting rule is copied into the target page are automatically formatted in accordance with the at least one formatting rule.

5. The system of claim 1 wherein the source page has at least one server identifier and at least one corresponding copying command identifier, each server identifier identifies the server device which executes the extracting, the replacing, and the reformatting, and each copying command identifier identifies at least one copying command that instructs the server to execute the extracting, the replacing, and the reformatting.

6. The system of claim 5 wherein the at least one server identifier and the at least one corresponding copying command identifier are each associated with a universal resource locator.

7. The system of claim 5 further comprising a Web browser that submits the at least one copying command identifier to the at least one server identified by the at least one server identifier.

8. The system of claim 7 wherein the Web browser comprises an interface that enables location information of the at least one target page to be input.

9. The system of claim 1, wherein the extraction system and the formatting system are implemented using a server system.

10. The system of claim 1, wherein the markup format interpreter is one of an HTML interpreter and an XML interpreter.

11. The system of claim 1, wherein at least one of the formatting templates is one of a title template and a prioritized task template.

12. The system of claim 1, wherein the extraction system is activated by a first button and the formatting system is activated by a second button.

13. The system of claim 12, wherein the first button is a control button and the second button is a page format button.

14. A method comprising:
   extracting from a source page selected based on an operator input (a) a first set of formatting information that is interpreted by a markup format interpreter and (b) a first set of formatting templates embedded in a code of the source page; and
   replacing in a target page selected based on an operator input (a) a portion of a second set of formatting information in the target page that is interpreted by a markup format interpreter with a corresponding portion of the first set of extracted formatting information and (b) at least one formatting template in a second set of formatting templates in the target page associated with at least one formatting template in the first set of extracted formatting templates, wherein each of the formatting templates includes at least one formatting rule, wherein the source page and the target page include at least one of the formatting rules that is embedded in comments that are ignored by the markup format interpreter, wherein the formatting rules control how data items defining at least a portion of content on the source page and the target page are formatted, wherein the replacing further comprises reformating each data item associated with one of the formatting templates that has been replaced in the second set of formatting templates, and wherein the first set of formatting templates comprises at least one formatting template comprising at least one string of formatting code including at least one of a set of tags and a type attribute for regulating a type of information that a user can provide and a type of form elements the user will be presented with to provide the information.

15. The method of claim 14 wherein at least one of the formatting rules from the source page is copied into the target page and used to control how at least one type of data item on the target page is to be formatted.

16. The method of claim 15 further comprising reformatting all data items of the at least one type in the target page in accordance with the at least one copied formatting rule.

17. The method of claim 16 wherein the source page has at least one server identifier and at least one corresponding copying command identifier, each server identifier identifies a server which executes the extracting, the replacing, and the reformating, and each copying command identifier identifies at least one copying command that instructs the server to execute the extracting, the replacing, and the reformatting.

18. The method of claim 17 wherein the at least one server identifier and the at least one corresponding copying command identifier are each associated with a universal resource locator.

19. The method of claim 17 further comprising submitting the at least one copying command identifier to the at least one server identified by the at least one server identifier using a Web browser.

20. The method of claim 19 further comprising inputting location information of the at least one target page through the Web browser.

21. The method of claim 15 wherein all data items of the at least one type that are added to the target page after the at least one formatting rule is copied into the target page are automatically formatted in accordance with the at least one formatting rule.

22. The method of claim 14, wherein the markup format interpreter is one of an HTML interpreter and an XML interpreter.

23. The method of claim 14, wherein at least one of the formatting templates is one of a title template and a prioritized task template.

24. The method of claim 14, wherein the extraction system is activated by a first button and the formatting system is activated by a second button.

25. The method of claim 24, wherein the first button is a control button and the second button is a page format button.

26. A computer-readable medium having stored thereon instructions, which when executed by at least one processor, causes the at least one processor to perform:

extracting from a source page selected based on an operator input (a) a first set of formatting information that is interpreted by a markup format interpreter and (b) a first set of formatting templates embedded in a code of the source page; and replacing in a target page selected based on an operator input (a) a portion of a second set of formatting information in the target page that is interpreted by a markup format interpreter with a corresponding portion of the first set of extracted formatting information and (b) at least one formatting template in a second set of formatting templates in the target page associated with at least one formatting template in the first set of extracted formatting templates, wherein each of the formatting templates includes at least one formatting rule, wherein the source page and the target page include at least one of the formatting rules that is embedded in comments that are ignored by the markup format interpreter, wherein the formatting rules control how data items defining at least a portion of content on the source page and the target page are formatted, wherein the replacing further comprises reformating each data item associated with one of the formatting templates that has been replaced in the second set of formatting templates, and wherein the first set of formatting templates comprises at least one formatting template comprising at least one string of formatting code including at least one of a set of tags and a type attribute for regulating a type of information that a user can provide and a type of form elements the user will be presented with to provide the information.

27. The medium of claim 26 wherein at least one of the formatting rules from the source page is copied into the target page and used to control how at least one type of data item on the target page is to be formatted.

28. The medium of claim 27 further comprising reformatting all data items of the at least one type in the target page in accordance with the at least one copied formatting rule.

29. The medium of claim 27 wherein all data items of the at least one type that are added to the target page after the at least one formatting rule is copied into the target page are automatically formatted in accordance with the at least one formatting.

30. The medium of claim 26 wherein the source page has at least one server identifier and at least one corresponding copying command identifier, each server identifier identifies a server which executes the extracting, the replacing, and the reformating, and each copying command identifier identifies at least one copying command that instructs the server to execute the extracting, the replacing, and the reformatting.

31. The medium of claim 30 wherein the at least one server identifier and the at least one corresponding copying command identifier are each associated with a universal resource locator.

32. The medium of claim 30 further comprising submitting the at least one copying command identifier to the at least one server identified by the at least one server identifier using a Web browser.

33. The medium of claim 32 further comprising inputting location information of the at least one target Web page through the Web browser.

34. The medium of claim 26, wherein the markup format interpreter is one of an HTML interpreter and an XML interpreter.

35. The medium of claim 26, wherein at least one of the formatting templates is one of a title template and a prioritized task template.

36. The medium of claim 26, wherein the extraction system is activated by a first button and the formatting system is activated by a second button.

37. The medium of claim 36, wherein the first button is a control button and the second button is a page format button.

* * * * *